United States Patent [19]

Long, II

[11] Patent Number: 5,098,982

[45] Date of Patent: Mar. 24, 1992

[54] RADIATION CURABLE THERMOPLASTIC POLYURETHANES

[75] Inventor: Carl J. Long, II, Elyria, Ohio

[73] Assignee: The B. F. Goodrich Company, Akron, Ohio

[21] Appl. No.: 419,236

[22] Filed: Oct. 10, 1989

[51] Int. Cl.$^5$ .................. C08J 9/224; C08G 18/30; C08G 59/02

[52] U.S. Cl. .................. 121/56; 528/44; 528/75; 528/82; 528/289; 528/546; 528/406; 528/513; 528/521; 172/349

[58] Field of Search .................. 528/44, 75, 289, 82; 425/58; 172/349; 548/46, 406, 521, 513; 521/56

[56] References Cited

U.S. PATENT DOCUMENTS

| | | | |
|---|---|---|---|
| 2,452,315 | 10/1948 | Morgan et al. | 156/153 |
| 2,487,106 | 11/1949 | Cornwell | 172/349 |
| 2,743,265 | 4/1956 | Tawney | 534/763 |
| 2,777,830 | 1/1957 | Shivers | 528/289 |
| 2,871,218 | 1/1959 | Schollenberger | 425/58 |
| 3,151,182 | 9/1964 | Alexander | 525/47 |
| 3,564,057 | 2/1971 | Tindall | 564/495 |
| 3,804,809 | 4/1974 | Brachman | 528/82 |
| 3,818,050 | 6/1974 | Baumann et al. | 549/61 |
| 3,833,619 | 9/1974 | Baumann et al. | 549/61 |
| 3,838,108 | 9/1974 | Hergenrother et al. | 528/73 |
| 3,975,330 | 8/1976 | Suzuki | 528/89 |
| 4,079,041 | 3/1978 | Baumann et al. | 526/58 |
| 4,107,174 | 8/1978 | Baumann et al. | 548/513 |
| 4,163,097 | 7/1979 | Baumann et al. | 525/531 |
| 4,172,836 | 10/1979 | Baumann et al. | 548/46 |
| 4,174,326 | 11/1979 | Baumann et al. | 548/456 |
| 4,193,927 | 3/1980 | Baumann et al. | 548/521 |
| 4,283,509 | 8/1981 | Zweifel et al. | 525/375 |
| 4,284,750 | 8/1981 | Amirsakis | 528/79 |
| 4,302,572 | 11/1981 | Locatelli et al. | 528/73 |
| 4,330,658 | 5/1982 | Ikeguchi et al. | 528/73 |
| 4,339,383 | 7/1982 | Wehner et al. | 548/419 |
| 4,369,302 | 1/1983 | Ikeguchi et al. | 528/73 |
| 4,390,686 | 6/1983 | Janssen et al. | 528/289 |
| 4,408,020 | 10/1983 | Kolycheck | 525/415 |
| 4,446,301 | 5/1984 | Belote et al. | 523/295.3 |
| 4,588,786 | 5/1986 | Kadono et al. | 525/327.6 |
| 4,612,132 | 9/1986 | Wollenberg et al. | 252/515 A |
| 4,639,531 | 1/1987 | Baumann et al. | 549/261 |
| 4,642,353 | 2/1987 | Berger | 548/431 |
| 4,643,949 | 2/1987 | Kolycheck et al. | 428/425.9 |
| 4,644,069 | 2/1987 | Baumann et al. | 549/261 |
| 4,656,292 | 4/1987 | Roth | 548/548 |
| 4,695,604 | 9/1987 | Amirsakis | 525/28 |
| 5,026,736 | 6/1991 | Pontiff | 521/56 |

OTHER PUBLICATIONS deAbajo, J. & de Santos, E., *Die Angewandte Makromolekulare Chemie.*, vol. 111, 1983, pp. 17–27 (No. 1698).

Baumann, M. E. et al., *Helvetica Chimica Acta*, vol. 67, 1984, pp. 1897–1905, (original & translation herewith).

Roth, M. & Muller, B., "DMI-Photopolymers and Their Technical Application", paper given at Radcure, Europe, 1987, pp. 5-11 to 5-23.

*Primary Examiner*—John Kight, III
*Assistant Examiner*—Duc Truong
*Attorney, Agent, or Firm*—Debra L. Pawl; Daniel J. Hudak; Laura F. Shunk

[57] ABSTRACT

Radiation curable linear thermoplastic polyurethanes having imido pendent groups of the formula (A)

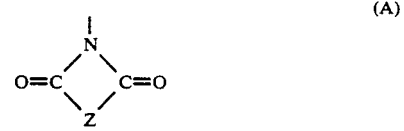

wherein Z is an unsaturated $C_{2-12}$ hydrocarbyl or substituted hydrocarbyl group (preferably $H_3CC=CCH_3$) capable of undergoing photocrosslinking with another like group Z, are prepared by reaction of (a) a macroglycol of molecular weight 500–7,000, (b) one or more glycol chain extenders each having a molecular weight less than 500, which may include one or more low molecular weight aliphatic glycols (e.g., a $C_{2-12}$ alkylene glycol or mixture thereof), and (c) an organic diisocyanate. Either a macroglycol or a chain extender must include a radiation sensitive pendent imido group of the above formula (A). The thermoplastic polyurethanes herein have hard and soft segments. Pendent groups (A) are present in the hard segments when a chain extender containing pendent group (A) is used, and are present in the soft segment when a macroglycol having pendent group (A) is used. The thermoplastic polyurethanes are useful for various purposes including coatings and magnetic recording media. Radiation curing gives a thermoset polyurethane having high hardness and good solvent resistance.

35 Claims, No Drawings

RADIATION CURABLE THERMOPLASTIC POLYURETHANES

TECHNICAL FIELD

This invention relates to radiation curable thermoplastic polyurethanes, intermediates therefor, and thermosetting polyurethanes prepared therefrom. More particularly, this invention relates to radiation curable thermoplastic polyurethanes (TPU's) having imide pendent groups, to imide modified chain extender intermediates for the preparation of such (TPU's), and to thermosetting polyurethanes obtained on radiation curing of said thermoplastic polyurethanes.

BACKGROUND ART

Thermoplastic polyurethanes (TPU's) are well known. These materials are elastomers which are useful in a variety of applications e.g., in wire and cable jacketing, calendared film, adhesives, automotive parts such as bumpers, roller skate and skateboard wheels, and as the binder in magnetic recording media. Thermoplastic polyurethanes are linear polymers which can be processed in conventional rubber and/or plastics processing equipment. TPU's can be milled, injection molded and calendared, for example. Physical properties, such as hardness and modulus vary depending on chemical compositon.

Thermoplastic polyurethanes are prepared by reacting one or more glycols with an organic diisocyanate (or, less commonly, a mixture of organic diisocyanates). Typically a mixture or blend of glycols, e.g. a macroglycol and one or more low molecular weight aliphatic glycols, is used. The macroglycol may be a hydroxyl terminated polyester, polyether or polycaprolactone polymer or oligomer, which typically has a molecular weight from about 500 to no more than about 10,000. The low molecular weight aliphatic glycols generally contain from 2 to about 12 carbon atoms. Representative low molecular weight aliphatic glycols include ethylene glycol, 1,3-butanediol, 1,4-butanediol, 1,5-pentanediol, 1,6-hexanediol, 1,4-cyclohexanedimethanol and diethylene glycol. The low molecular weight glycol or mixture thereof is commonly called a chain extender. A thermoplastic polyurethane prepared from such macroglycol, one or more low molecular weight glycols and organic diisocyanate is generally characterized by the presence of both hard and soft segments.

An early patent on linear thermoplastic polyurethanes and their preparation is U.S. Pat. No. 2,871,218 to Schollenberger (issued in 1959). A number of patents have been granted and various technical journal articles published on thermoplastic polyurethanes since then. Among the patents are U.S. Pat. Nos. 4,284,750 (Amirsakis) and 4,643,949 (Kolycheck et al), both direct to TPU for magnetic tape.

U.S. Pat. No. 4,695,604 to Amirsakis discloses electron beam curable polyurethanes which are reaction products of a hydroxyl terminated polyester, a compound having ethylenic unsaturation, and at least 2 hydroxyl moieties, optionally a chain extender which is a lower aliphatic or cycloaliphatic diol, and a stoichiometric amount of a diisocyanate. The unsaturated compound may be an allyl dihydroxyalkyl ether (e.g., glyceryl allyl ether) or a dihydroxyalkyl methacrylate (e.g. 2,3-dihydroxyalkyl methacrylate). The electron beam curable polyurethane typically has short chain unsaturated aliphatic pendent groups.

Other photopolymers having photocrosslinkable maleimide pendent groups are known. For example, Roth et al, "DMI-Photopolymers and Their Technical Application," paper given at Radcure, Europe, 1987, pages 5-11 to 5-23, describes acrylic polymers having photocrosslinkable dimethylmaleimide groups. Aromatic polyamides with maleimide pendent groups which are either heat or photocrosslinkable are disclosed in de Abajo et al., *Die Angewandte Makromolekulare Chemie*, vol. 111, 1983, pages 17-27 (no. 1698). Other imide pendent groups are also discussed.

U.S. Pat. No. 4,107,174 to Baumann et al., also discloses certain photocrosslinkable polymers having imidyl pendent groups. U.S. Pat. No. 4,642,353 to Berger shows various photocrosslinkable polymers, among them certain polyurethanes (formulas XV and XVI of Berger) containing imidyl groups linked to the polymer chain through a sulfur atom and an alkylene, arylene or substituted arylene group. (In contrast, polymers of the present invention contain no sulfur). These photocrosslinkable polymers are prepared by reaction of an unsaturated polymer with an imidyl compound having an —SCl or —SH end group. Preparation of the polymers described in this patent would present environmental problems, i.e. both odor and toxicity, because, of combined sulfur present in both the non-polymeric reactant and the polymer product.

DISCLOSURE OF THE INVENTION

This invention provides novel radiation curable linear thermoplastic polyurethanes which have pendent groups of the following formula (A):

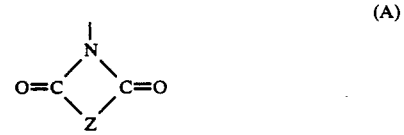

(A)

wherein Z is an unsaturated divalent hydrocarbyl or substituted hydrocarbyl group containing from 2 to about 12 carbon atoms and capable of undergoing crosslinking with another like group Z.

Pendent groups (A) are preferably linked directly to carbon atoms in the polyurethane chain or backbone. Alternatively, the pendent groups (A) may be linked to the polymer backbone through short aliphatic side chains containing carbon, hydrogen and optionally oxygen as the only elements.

Preferred pendent groups are those of the following formula (A'):

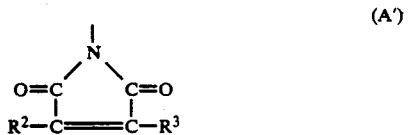

(A')

wherein $R^2$ and $R^3$ may be the same or different, and each is hydrogen or a lower alkyl radical containing from 1 to about 3 carbon atoms, or $R^2$ and $R^3$ may be joined together to form, together with the respective carbon atoms to which they are attached, a cyclic hydrocarbyl or substituted hydrocarbyl radical containing from 2 to about 12 carbon atoms.

The thermoplastic polyurethanes of this invention have both hard and soft segments. The pendent groups may occur in either segment.

The thermoplastic polyurethanes of this invention are reaction products of a plurality of at least 2 glycols including at least one macroglycol having a molecular weight in the range of 500 to about 7,000 and at least one chain extender having a molecular weight less than 500, with an organic diisocyanate or mixture thereof. The polyurethanes of this invention generally contain carbon, hydrogen, oxygen and nitrogen as the only elements.

This invention also provides novel intermediates for making the novel thermoplastic polyurethanes, novel thermosetting polyurethanes obtained by curing of the thermoplastic polyurethanes, and processes for making the above intermediates and products.

The novel intermediates are compounds of the following formula (III):

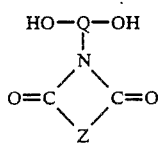
(III)

wherein Q is a trivalent hydrocarbyl or substituted hydrocarbyl radical having from 3 to about 20 carbon atoms and in which the valence bonds are attached to different carbon atoms, and wherein Z is as previously defined.

The novel thermosetting polyurethanes have cross-linking groups of the general formula (B)

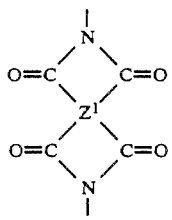
(B)

wherein $Z^1$ is a tetravalent radical formed by addition reaction of two radicals Z.

The above symbols, and all symbols subsequently defined shall have the above definitions throughout the specification and claims. Also throughout the specification and claims, all percentages are weight percent unless a different basis (e.g., mole percent) is specifically stated. All polyester molecular weights herein are values obtained by end group analysis.

BEST MODE FOR CARRYING OUT THE INVENTION

Chain Extender Intermediate

Reaction of an amino glycol of the general formula (I) shown below:

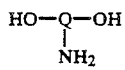
(I)

wherein Q is a trivalent hydrocarbyl or substituted hydrocarbyl radical containing from 3 to about 12 carbon atoms and in which the valence bonds are attached to different carbon atoms, with an anhydride of the general formula (II) shown below:

(II)

wherein Z is as previously defined, yields an imide modified glycol intermediate of the formula (III) shown below.

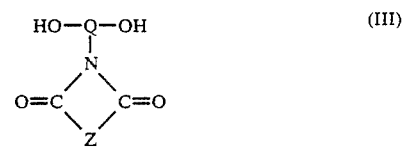
(III)

It will be observed that the above intermediate (III) has a pendent imido group of the formula (A) as given previously.

Preferred amino glycols are compounds of the following formula (I-a):

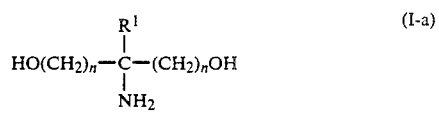
(I-a)

wherein $R^1$ is hydrogen, a lower alkyl radical containing from 1 to about 6 carbon atoms, or phenyl; and n is from 1 to about 7. The amino group of the preferred glycol is attached to either a secondary or a tertiary carbon atom.

The preferred unsaturated cyclic anhydride (II) is a compound of the following formula (II-a)

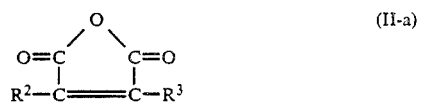
(II-a)

wherein $R^2$ and $R^3$ independently are each hydrogen, a lower alkyl radical containing from 1 to about 3 carbon atoms, or $R^2$ and $R^3$, together with the carbon atoms to which they are joined, form an unsaturated hydrocarbyl or substituted hydrocarbyl radical containing from four to about twelve carbon atoms. Preferably either $R^2$ or $R^3$, or both, is lower alkyl.

It will be observed that compounds (I-a) and (II-a) are special cases of (I) and (II), respectively, wherein Q is a group of a formula (C)

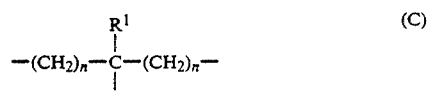
(C)

and Z is a group of the following formula (D)

(D)

All groups which are optionally substituted, such as Q, $R^2$ and $R^3$, when substituted should contain only substituents which are essentially non-reactive under subsequent reaction conditions. In the case of Q, $R^2$ and $R^3$ any substituent present must be non-reactive under both imide forming conditions and urethane forming conditions. Thus, non-reactive substituents such as halogen (particularly chlorine) and trifluoromethyl may be present, while substituents which may be reactive, such as —OH, —SH, and —NH$_2$ should be avoided.

Particularly preferred amino glycol starting materials are compounds of formula (I-a) in which $R^1$ is hydrogen or lower alkyl of 1 to about 4 carbon atoms and in which the two n's are equal. More preferably, $R^1$ is lower alkyl of 1 to about 4 carbon atoms. The most preferred amino glycol starting material is 2-amino-2-ethyl-1,3-propanediol ($R^1$=ethyl; n=1).

Particularly preferred anhydride starting materials are compounds of the formula (II-a) in which $R^2$ and $R^3$ when taken independently are as previously defined and when taken together form, together with respective carbon atoms to which they are attached, a 5- or 6-member ring. More preferably, $R^2$ and $R^3$ are each lower alkyl radicals containing from 1 to about 3 carbon atoms. The most preferred anhydride starting material is 2,3-dimethylmaleic anhydride (DMMA).

Anhydride starting materials of the formula (II) are well known and literature describing their preparation is extensive.

Compounds of the formula (I-a) can be made by reduction of the corresponding nitroglycol, which in turn can be prepared from the corresponding nitroalkane and formaldehyde, according to the process disclosed in U.S. Pat. No. 3,564,057.

Intermediate (III) is an unsaturated N-dihydroxyalkyl substituted cyclic imide.

Reaction of a preferred amino glycol of the formula (I-a) with a preferred unsaturated cyclic anhydride of the formula (II-a) gives a preferred imide intermediate of the formula (III-a) shown below.

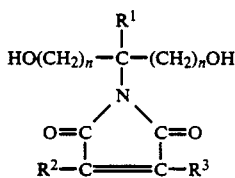
(III-a)

Especially preferred imide intermediates (III-a) are those obtained by reacting an especially preferred amino glycol (I-a) as above defined with an especially preferred anhydride (II-a) as above defined. The especially preferred intermediates are maleimides or substituted maleimides, particularly the latter. Reaction of 2-amino-2-ethyl-1,3-propanediol with 2,3-dimethylmaleic anhydride gives the more preferred intermediate, i.e. N-[1,1-bis(hydroxymethyl)propyl]dimethyl maleimide.

Reaction of (I) with (II) to form (III) may be carried out either neat or in a suitable solvent in a closed reactor which has been previously purged with an inert gas, followed by vacuum distillation of the rection mixture to recover the product. The most preferred imide intermediate, i.e. N-[1,1-bis(hydroxymethyl)propyl]-dimethyl maleimide, can be formed either in the absence or in the presence of a solvent at a temperature of about 100° C. for about one to about three hours. In general, substituted imides (III) can be prepared under similar conditions, although some adjustment of time and/or temperature may be necessary depending on the volatilities of the reactants (I) and (II) and the substituted imide. Essentially equimolar quantitites of the amino glycol and the anhydride are reacted.

Imide Modified Polyurethane (hard segment incorporation)

An imide intermediate (III), a macroglycol and optionally one or more low molecular weight $C_{2-12}$ glycols, are reacted with an organic diisocyanate or mixture thereof according to a first embodiment of this invention to form a linear thermoplastic polyurethane (IV) having pendent imido groups preferably of the formula (A) given previously incorporated in the hard segments. The intermediate (III) serves as a chain extender, and optionally the only chain extender in this reaction.

The macroglycol may be a hydroxyl terminated polyester, a hydroxyl terminated polycarbonate, a hydroxyl terminated polyether or a hydroxyl terminated polycaprolactone having 2 hydroxyl groups per molecule. The macroglycol should not have any other active hydrogen atoms which will react with the isocyanate under the reaction conditions utilized. The macroglycol ordinarily will have a molecular weight from about 500 to about 10,000, particularly from about 600 to about 4,000, more especially from about 800 to about 2,000. A mixture of macroglycols can be used.

Preferred macroglycols are the hydroxyl terminated polyesters and are obtained by reacting one or more low molecular weight glycols, containing from 2 to about 12 carbon atoms, with one or more low molecular weight aliphatic, cycloaliphatic or aromatic dicarboxylic acids containing from 4 to about 12 carbon atoms. Glycols suitable for use in the present invention include aliphatic diols containing 2 to 12 carbon atoms such as ethylene glycol, propylene glycol, 1,4-butanediol, 1,5-pentanediol, neopentyl glycol, 1,6-hexanediol, 1,7-heptanediol, 1,8-octanediol, 2-ethyl-1,6-hexanediol, 2,2,4-trimethylhexanediol, 1,10-decanediol, hydrogenated dilinoleylglycol, hydrogenated dioleylglycol and cycloaliphatic diols such as 1,3-cyclohexanediol, 1,4-cyclohexanediol, 1,4-cyclohexane dimethanol, 1,4-endomethylene-2-2-hydroxy-5-hydroxymethyl cyclohexane, diethylene glycol and polyalkylene glycols. The diols used may be a single diol or a mixture of diols, depending on the properties desired in the finished product.

Preferred dicarboxylic acids for forming hydroxyl terminated polyesters are saturated aliphatic dicarboxylic acids containing 4 to about 12 carbon atoms. Representative acids are succinic, adipic, pimelic, suberic, azelaic and sebacic acids. The corresponding anhydride of acyl halide (e.g. acyl chloride) can be used in place of the acids. Cycloaliphatic acids, e.g., 1,4-cyclohexanedicarboxylic acids and aromatic acids such as phthalic acid and terephthalic acid can be used, although in general the saturated aliphatic acids are preferred.

Especially preferred polyesters are those obtained by reaction of a lower alkanol such as ethylene glycol or 1,4-butanediol with adipic acid. A slight molar excess of the glycol, i.e. about 1.5 to about 1.01 moles of glycol per mole of acid is used, as is well known, to obtain a hydroxyl terminated polyester having the desired molecular weight.

Hydroxyl terminated polycarbonates represent another suitable class of macroglycols. These may be made according to the teachings of U.S. Pat. No. 4,643,949 to Kolycheck, et al. This patent also lists suitable glycols and suitable organic carbonates for making hydroxyl terminated polycarbonates.

Polyether glycols, or hydroxyl terminated polyethers, constitute another class of macroglycols. These may be made, for example, by a polymerization of tetrahydrofuran, which yield polytetramethylene ether glycols (see, for example, U.S. Pat. No. 2,901,467); or by polymerization of either ethylene oxide or propylene oxide. Mixed polyether glycols (e.g., polyalkylene-arylene ether glycols) and their preparation are disclosed in U.S. Pat. No. 2,843,568.

The above citations of references for the preparation of macroglycols are merely illustrative; preparation of macroglycols of each of the above classes is well known in the art.

The glycol reactants may also include one or more saturated low molecular weight glycols, preferably aliphatic, and in particular, alkylene glycols containing from 2 to about 12 carbon atoms. These normally have molecular weights not over about 300. These serve as additional or secondary chain extenders. Representative aliphatic glycols of this type include ethylene glycol, propylene glycol, 1,4-butanediol, 1,3-butanediol, 1,5-pentanediol, 1,6-hexanediol, 1,4-cyclohexanedimethanol, hydroquinone dihydroxyethyl ether and diethylene glycol. Other aliphatic side chain in the case of cycloaliphatic and aromatic glycols can be used.

The glycols undergoing reaction, at least 2 in number, normally consist of one or more macroglycols as above defined and one or more chain extenders, all having molecular weights less than 500. One of the chain extenders (the primary chain extender) has the formula (III) as above described. The additional (or secondary) chain extenders when present are low in molecular weight and are typically $C_{2-12}$ alkylene glycols as previously described. The isocyanate may be an aliphatic, cycloaliphatic or aromatic diisocyanate, an aromatic diisocyanate being generally preferred. The diisocyanate or mixture thereof may be represented by the formula OCN—$R^4$—NCO wherein $R^4$ is one or more divalent organic radical. A particularly desirable isocyanate is diphenylmethane-4,4'-diisocyanate, which is commonly known as MDI. Other operable diisocyanates are the aliphatic diisocyanates containing 2 to 12 carbon atoms, such as tetramethylene diisocyanate, hexamethylene diisocyanate and the like; the cycloaliphatic diisocyanates, such as cyclohexyl diisocyanate and the like; the aromatic diisocyanates containing 6 to 18 carbon atoms in the ring(s) such as the phenyl diisocyanates, the toluene diisocyanates and the like; the dicycloaliphatic diisocyanates containing 8 to 16 carbon atoms in the rings, such as cyclohexyl methane diisocyanate and the like; and the diaryl diisocyanates, such as MDI, dichlorodiphenyl methane diisocyanate, dimethyl diphenyl methane diisocyanate, diphenyl dimethyl methane diisocyanate, dibenzyl diisocyanate, diphenyl ether diisocyanate and the like.

Polyols and isocyanates having functionalities higher than 2 should be excluded from the reaction mixture.

Reaction of the glycols and the isocyanate may be carried out in either one or two steps.

Products having a wide range of physical and mechanical properties are obtainable according to the present invention, depending on the particular macroglycol (or mixture thereof), imide chain extender (III), low molecular weight aliphatic glycol or mixture thereof (when present) and diisocyanate chosen and the relative amounts thereof. Linear thermoplastic polyurethanes obtainable according to the present invention exhibit virtually the same wide range of physical and mechanical properties as do linear thermoplastic polyurethanes presently known in the art. In addition, the linear thermoplastic polyurethanes of this invention, by virtue of the radiation curable pendent imido group (A) present, are curable into thermosetting polyurethanes characterized by high solvent and chemical resistance and excellent thermal stability. Thermosetting polyurethanes of this invention are markedly superior in these respects to either the linear thermoplastic polyurethanes of this invention or to linear thermoplastic polyurethane known in the art.

The amount of chain extender, which is the sum of the amounts of the imide chain extender (III) and low molecular weight glycols when present, can vary from 0.1 to 10 moles per mole of macroglycol, preferably from 0.5 to 5 moles. The imide chain extender (III) constitutes from 10 to 100 mole percent of the total chain extender content, and conversely the low molecular glycol chain extender(s) constitutes from 90 to 0 mole percent of total chain extender content.

The equivalent ratio of isocyanate to polyol (i.e. —NCO/—OH equivalent ratio) which is the same as the molar ratio when only difunctional reactants are used, may be in the range of about 0.95 to about 1.01, preferably from about 0.97 to about 1.001.

Reaction of the polyol mixture with the isocyanate (or mixture thereof) may be carried out either as a bulk or as a solution polymerization process. Preferred temperatures and reaction times depend on the composition of the polyol mixture, the particular isocyanate and whether bulk or solution polymerization is used. The most preferred reactants may be reacted in bulk by standard high temperature random melt polymerization procedures. Solution polymerization temperatures are normally somewhat lower than bulk polymerization temperatures. Suitable solvents include tetrahyrofuran (THF), toluene, methylethylketone (MEK) and dimethylformamide (DMF). A suitable catalyst, e.g., stannous octoate, may be used.

Thermoplastic polymers of this invention wherein the imido pendent group (A) is incorporated in the hard segment may be represented by the following formula (IV)

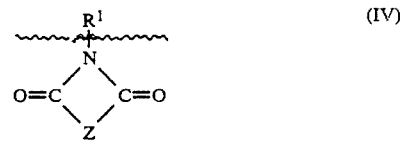

(IV)

wherein the wavy line denotes the polymer backbone and $R^1$ and Z are as previously defined. Preferred thermoplastic polymers of this invention are polymers of the following formula (IV-a)

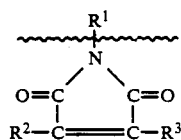

(IV-a)

wherein the wavy lines, $R^1$, $R^2$ and $R^3$ are as previously defined. Preferred thermoplastic polymers are obtained when a preferred chain extender of the formula (III-a) is used.

Thermoplastic polyurethanes of the formula (IV) are composed of moieties of the respective glycol reactants (i.e., the macroglycol, the chain extender intermediate III, and the aliphatic glycol when used), the moiety in each case being the glycol itself minus the terminal hydrogen atoms, and urethane moieties of the following formula (E):

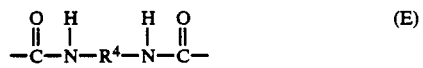

(E)

where $R^4$ is as previously defined, in essentially the same molar proportions as the proportions of the respective glycols and isocyanate in the reactant mixture. These polyurethanes have a soft segment consisting of the macroglycol moiety, and a hard segment composed of chain extender moieties, and the urethane moiety.

Thermoplastic polyurethanes of the formula (IV) may be radiation cured by standard radiation curing techniques such as ultraviolet light (which is preferred) or electron beam radiation. Standard free radical curing techniques, e.g., thermal curing and curing with peroxide catalysis, can also be used. The term, "radiation curing" as used herein, denotes curing with electromagnetic radiation having a wavelength not greater than about 450 nanometers (which is near the blue end of the visible spectrum) nor shorter than about 190 nanometers. Ultraviolet radiation is preferred in most cases because all thermoplastic polyurethanes within the scope of this invention are curable by ultraviolet radiation. Electron beam radiation, on the other hand, cannot be used for curing of certain polymers within the scope of this invention, as for example thermoplastic polyurethanes of the formula (VI-a) where both $R^2$ and $R^3$ are alkyl radicals or where $R^2$ and $R^3$ are joined together to form an alkylene radical. Where applicable, electron beam curing is a desirable technique because it permits the curing of articles and coatings of greater thickness than does ultraviolet radiation.

Thermosetting polyurethanes of this invention have the following formula (V)

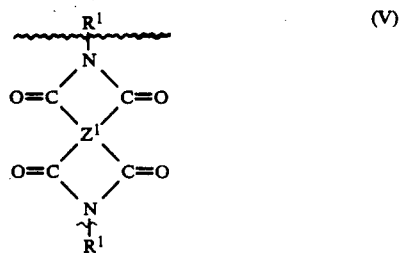

(V)

wherein the wavy line, $R^1$ and Z are as previously defined.

When a preferred thermoplastic polyurethane of the formula (IV-a) given previously is used, the resulting thermosetting polyurethane has the following formula (V-a)

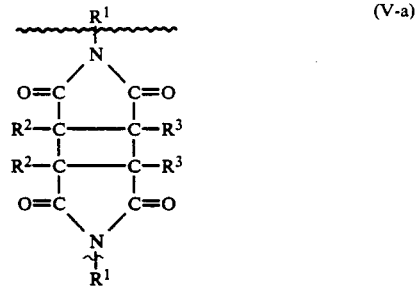

(V-a)

Polyurethanes (soft segment incorporating segment)

Thermoplastic polyurethanes in which the pendent imido groups are contained in the soft segment can also be prepared according to a second and preferred embodiment of this invention. According to this second embodiment, one or more macroglycols each having a molecular weight from about 500 to about 7,000, including at least one imide functionalized macroglycol, i.e., a macroglycol incorporating one or more pendent imido groups of the formula (A), and one or more low molecular weight glycol chain extenders, are reacted with one or more organic diisocyanates. The imide functionalized macroglycol can be an imide functionalized polyester, an imide functionalized polyether, or imide functionalized polycaprolactone, in each case having 2 terminal —OH groups.

The macroglycol which incorporates one or more pendent imido groups (A) (i.e., the imide functionalized macroglycol) is prepared by reacting an intermediate of the formula (III) with one or more difunctional (i.e., dibasic) esterifying agents. The esterifying agent may be, for example, (a) a dicarboxylic acid, or ester thereof, or an acid anhydride or acyl halide (where a polyester is desired), or (b) a carbonate or phosgene (where a polycarbonate is desired). Conventional esterifying or etherifying conditions may be used.

Additional macroglycols, having molecular weights in the range of 500 to 7,000 but not including a pendent imido group (A), may be used if desired.

Dicarboxylic acids useful as esterifying agents may be either aliphatic, cycloaliphatic or aromatic, and may contain from 2 to about 12 carbon atoms. Suitable dicarboxylic acids of the formula (VIII) include succinic, adipic, azelaic, sebacic, phthalic and terephthalic acids; adipic acid is preferred.

Esters of dicarboxylic acids are ordinarily lower alkyl esters, e.g., methyl, ethyl, propyl, isopropyl, butyl, isobutyl, sec-butyl or tert-butyl esters.

One or more low molecular weight aliphatic glycols serve(s) as a chain extender (or chain extenders). Suitable glycols of this type include ethylene glycol, 1,4-butanediol, 1,6-hexanediol, 1,4-oyclohexanedimethanol and diethylene glycol. These glycols are typically aliphatic or cycloaliphatic and typically contain from 2 to about 12 carbon atoms.

The macroglycol moiety, which is the modified polyester polyol minus the terminal hydrogen atoms, constitute the soft segment and the remaining moieties, i.e. alkylene glycol moieties and the isocyanate moiety (or moieties) of the formula (C) given above, constitute the hard segment. Thus, the pendent imido group (A) is contained in the soft segment.

The —NCO/—OH equivalent ratio, which is also the mole ratio of total isocyanate to total glycol when no polyols or isocyanates having functionalities higher than 2 are present, may be from about 0.95 to about 1.01, preferably 0.97–1.001.

The amount of low molecular weight glycol chain extenders can vary from 0.1 to 10 moles per mole of macroglycol, preferably from 0.5 to 5 moles per mole of macroglycol.

Thermoplastic polyurethanes containing pendent imido groups (A) in the soft segment can be radiation cured by known radiation curing means, e.g., ultraviolet or electron beam (preferably ultraviolet) or by other free radical curing means (e.g. thermal or peroxide curing), to give cured, cross-linked thermosetting polyurethanes.

Thermoplastic polyurethanes in which the pendent imido groups occur only in the soft segment, and the resulting thermosetting polyurethanes, constitute the preferred embodiment of this invention. An advantage of incorporation of the pendent imido groups (A) into the soft segment is that pendent imido groups in the soft segment do not interfere with hard segment crystallization.

Properties and Uses

Thermoplastic polyurethanes of this invention (both embodiments) possess the highly desirable properties which are characteristic of thermoplastic polyurethanes, e.g., melt processibility (which permits conventional milling, extrusion, injection molding and calendaring on conventional plastic processing equipment), high strength after cooling, high tensile strength, high elongation and medium to good solvent resistance. Processibility of the thermoplastic polyurethanes of this invention is superior to that of known heat curable thermoplastic polyurethanes, since melt processing of the latter can cause partial curing. Thermoplastic polyurethanes of this invention possess far better mechanical properties than do the presently known radiation curable thermoplastics, which behave as non-Newtonian liquids and are therefore, unable to hold their shape when stress is applied. Thermoplastic polyurethanes of this invention are more easily cured in place than are previously known polyurethanes, none of which (as far as applicant is aware) are radiation curable. The ability to use radiation curing rather than conventional heat curing is highly advantageous, particularly when the polyurethane forms part of a composite article (a coating, for example) and is used in proximity with another component which is adversely affected by heat. Ultraviolet (UV) curing is best suited to curing of thin coatings and films, up to about 5 mils (0.005 inch) thick. Other curing methods, e.g. electron beam (EB) and peroxide curing can be used to form thicker pieces including shaped (e.g. molded) articles.

Thermosetting polyurethanes of this invention, obtained on radiation curing of thermoplastic polyurethanes, are hard materials having good solvent resistance, good abrasion resistance, and good adhesion to most substrate materials when applied as coatings thereto. The thermosetting resins are cross-linked, and are tack-free.

Polyurethanes of this invention may be used for a variety of purposes. In particular, they may be used as coatings such as fabric or appliance coatings. The polymers of this invention are also useful as surface coatings on other materials. They adhere well to wood, steel, aluminum, and concrete and may be applied by conventional means.

Polyurethanes of this invention may also be used as the outer jacket material for electrical wire and cable. They have good flex resistance and low electrical conductivity in both the thermoplastic and thermosetting states. Other uses for the polyurethanes of this invention include binders for magnetic recording media. In general, thermoplastic polyurethanes of this invention and the cured or thermosetting resins prepared therefrom may be used for any purposes for which thermoplastic polyurethanes and cured polyurethanes made therefrom have been found useful in the art.

This invention will now be described further with reference to the specific examples which follow:

EXAMPLE 1

Preparation of N-[1,1-bis(hydroxymethyl)propyl]dimethyl maleimide (HMPDM) (III-a)

2-amino-2-ethyl-1,3-propanediol (I-a) (297.9 grams, 2.50 moles) is charged to a reactor and heated to 70° C. under nitrogen. Then, 315.0 grams (2.50 moles) of 2,3-dimethylmaleic anhydride (DMMA) (II-a) is added portionwise with stirring to the reactor. The material is heated to a sufficient temperature (110°–130° C.) to drive off the water of condensation which is collected in a Dean-Stark trap. Once the theoretical amount of water is collected the product is isolated by vacuum distillation (167°–176° C. at 3 mm Hg). This product is used as an intermediate for the formation of polyurethanes and polyesters as will be described in succeeding examples.

EXAMPLE 2

Preparation of Thermoplastic Polyurethane (VI-a) Hard Segment Incorporation 150.00 grams (0.1500 moles) of a polyether polyol with a molecular weight of 1,000 is blended at 60° C. with 10.36 grams (0.0456 moles) of HMPDM and 10.36 grams (0.1151 moles) of 1,4-butanediol. The stannous octoate catalyst is then added to the blend at a concentration of 100 ppm and the blend is then reacted with 76.36 grams (0.3054 moles) of MDI by standard high temperature random melt polymerization procedure.

EXAMPLE 3

Preparation of Maleimide Functional Polyester

To a suitable reactor equipped with a mechanical stirrer, thermometer, packed column, condenser, and distillate receiver is added 1046.52 grams (7.17 moles) of adipic acid, 763.04 grams (8.48 moles) of 1,4-butanediol and 190.66 grams (9.84 moles) of HMPDM. The reactor is then slowly heated to a temperature of 100°–120° C. and the water of estrification is taken off. When the head temperature drops to about 50° C. (about 4–6 hours) the atmospheric esterification part is complete. At this time 0.05 grams of the transesterification catalyst stannous chloride is added and the reactor is attached to a vacuum pump. A vacuum is applied and the reactor is heated slowly to 200° C. (not to exceed 215° C.) to effect the transesterification. Removal of water and diol is continued until the acid number is less than 1.0 and the target hydroxyl number has been achieved (usually takes 18-36 hours). The final product has a hydroxyl number of 84.53 (corresponding to a molecular weight of 1,310), acid number of 0.51 and a water content of 0.05 percent as determined by Karl Fisher titration.

EXAMPLE 4

Preparation of Thermoplastic Polyurethane-Soft Segment Incorporation 90.00 grams (0.069 moles) of an imido-polyester polyol as described in Example 3 is blended at 60° C. with 10.11 grams (0.113 moles) of 1,4-butanediol. Stannous octoate catalyst is then added to the blend at a concentration of 100 ppm and the blend is then reacted with 45.09 grams (0.180 moles) MDI by the standard high temperature random melt polymerization procedure.

EXAMPLE 5

Preparation of Thermoplastic Polyurethane-Both Hard and Soft Segment Incorporation 90.00 grams (0.070 moles) of an imido-polyester polyol prepared as described in Example 3 is blended at 60° C. with 36.20 grams (0.159 moles) of HMPDM (Example 1). Stanous octoate catalyst is then added to the blend at a concentration of 100 ppm and the blend is then reacted with 56.79 grams (0.227 moles) of MDI by the standard high temperature random melt polymerization procedure.

EXAMPLE 6

Radiation Curing of Thermoplastic Polyurethane Films

Thin film samples of the thermoplastic polyurethanes (Examples 2, 4 and 5) are prepared by casting from THF on release paper to give approximately 1 mil films. Films are allowed to air dry and then are dried at 80° C. for 30 minutes prior to UV curing. The films are then cured using a RPC Industries Ultraviolet Processor using two medium pressure mercury arc lamps at a line speed of 20 feet per minute. In each case, the thermoplastic polyurethanes are converted to thermosetting polyurethanes as judged by their insolubility in the THF after curing. Properties of the cured films are shown in Table I below.

TABLE I

|  | Example 2 | Example 4 | Example 5 |
|---|---|---|---|
| Backbone | Polyether | Imido-Polyester | Imido-Polyester |
| Chain Extender | 1,4-BDO HMPDM | 1,4-BDO | HMPDM |
| Di-isocyanate | MDI | MDI | MDI |
| Immediate Melt Index (g Polymer/10 min.) | 23.4 (190° C./8700 g) | 6.2 (190° C./8700 g) | 51.2 (190° C./3800 g) |
| Brookfield Viscosity | 340 | 800 | 100 |
| % Area Swell | Gel | 125 | Gel |

Notes:
1,4-BDO — 1,4-butanediol
Brookfield Viscosities are at 15 percent total solid in THF
% Area Swells are run on 1 × 1 in. sq. 1 mil samples by immersing the sample in THF for four hours at ambient temperature and measuring the swell area.

Examples 2 and 5 have been designated as being a gel in the % Area Swell test. These materials are insoluble as is the case with Example 4; however, in the case of Example 4, the film maintained its integrity and was able to be measured easily. Films from Examples 2 and 5 are nevertheless crosslinked; however, area swell cannot be measured due to a more fragile nature of their film properties. The difference in these film properties can be explained by the fact that in Examples 2 and 5, the crosslinking functionality is incorporated in the hard segment of the polymer which detracts from the normal hard segment crystallization which occurs in thermoplastic polyurethanes. Therefore the preferred embodiment of this invention is that in which the pendent group is incorporated into the soft segment only, so as to gain optimum properties from the thermoset polyurethane.

While in accordance with the patent statutes only the best mode and preferred embodiment of the invention has been illustrated and described in detail, it is to be understood that the invention is not limited thereto or therby, but that the scope of the invention is defined by the appended claims.

What is claimed is:

1. An essentially linear radiation curable thermoplastic polyurethane, said polyurethane having hard segments and soft segments and being the reaction product of at least one organic diisocyanate and a plurality of glycols, said plurality of glycols including at least one macroglycol having a molecular weight from 500 to about 7,000, said polyurethane including dependent groups of the formula (A)

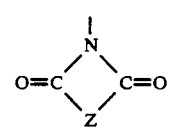

(A)

wherein Z is an ethylenically unsaturated hydrocarbyl or substituted hydrocarbyl group containing from 2 to about 12 carbon atoms and wherein said pendent group (A) is capable of undergoing crosslinking with another like pendent group of the above formula (A), said pendent groups (A) being linked directly to carbon atoms; whereby said polyurethane is curable by radiation other than electron beam radiation.

2. A radiation curable thermoplastic polyurethane according to claim 1 wherein said pendent groups are of the formula (A')

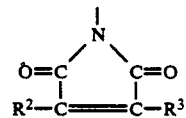

(A')

wherein $R^2$ and $R^3$ may be the same or different and each is a lower alkyl radical containing from 1 to 3 carbon atoms, or $R^2$ and $R^3$ may be joined together to form, together with the respective carbon atoms to which they are attached, a cyclic hydrocarbyl or substituted hydrocarbyl radical containing from 2 to about 12 carbon atoms.

3. A radiation curable thermoplastic polyurethane according to claim 2 wherein $R^2$ and $R^3$ are each lower alkyl radicals containing from 1 to about 3 carbon atoms.

4. A radiation curable thermoplastic polyurethane according to claim 3 wherein $R^2$ and $R^3$ are each methyl.

5. A radiation curable thermoplastic polyurethane according to claim 1 wherein said at least one of said glycols is a chain extender having a pendent imido group of the foregoing formula (A).

6. A radiation curable thermoplastic polyurethane according to claim 5 wherein said chain extender has the following formula (III)

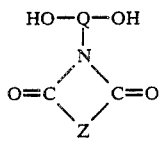
(III)

wherein Q is a trivalent hydrocarbyl or substituted hydrocarbyl radical in which the valence bonds are attached to different carbon atoms, and Z is an unsaturated divalent hydrocarbyl or substituted hydrocarbyl radical containing from 2 to about 12 carbon atoms and capable of undergoing crosslinking with another like group Z.

7. A radiation curable thermoplastic polyurethane according to claim 1 wherein said at least one said macroglycol includes a hydroxyl terminated polyester.

8. A radiation curable thermoplastic polyurethane according to claim 1 wherein at least one said macroglycol includes a hydroxyl terminated polycarbonate.

9. A radiation curable thermoplastic polyurethane according to claim 1 wherein at least one said macroglycol includes a hydroxyl terminated polyether.

10. A radiation curable thermoplastic polyurethane according to claim 1 wherein said at least one said macroglycol includes a hydroxyl terminated polycaprolactone.

11. A radiation curable thermoplastic polyurethane according to claim 1 wherein at least one of said glycols is an imido functionalized macroglycol incorporating one or more pendent groups of the forgoing formula (A).

12. A thermoplastic polyurethane according to claim 11 wherein said imido functionalized macroglycol is a hydroxyl terminated polyester.

13. A radiation curable thermoplastic polyurethane according to claim 11 wherein said imido functionalized macroglycol is a hydroxyl terminated polycarbonate.

14. A radiation curable thermoplastic polyurethane according to claim 1 wherein said imido functionalized macroglycol is a hydroxyl terminated polycaprolactone.

15. A radiation curable thermoplastic polyurethane according to claim 1 wherein the equivalent ratio of diisocyanate to said glycols in the reactants is from about 0.95 to about 1.01 and the reactants are substantially devoid of polyols and isocyanates having functionalities higher than 2.

16. A thermosetting polyurethane, said thermosetting polyurethane being the product obtained on radiation curing of a linear thermoplastic polyurethane as claimed in claim 1.

17. A polyurethane selected from the group consisting of (a) a radiation curable thermoplastic polyurethane according to claim 1, and (b) a thermoset polyurethane obtained on radiation curing of the same.

18. An imide modified glycol for polyurethane synthesis, said glycol being a compound of the formula (III):

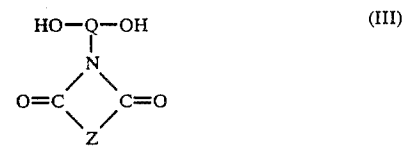
(III)

wherein: Q is a trivalent hydrocarbyl or substituted hydrocarbyl from 3 to about 20 carbon atoms, and in which the valence bonds are attached to different carbon atoms;

Z is an unsaturated divalent hydrocarbyl or substituted hydrocarbyl group containing from 2 to about 12 carbon atoms and capable of undergoing crosslinking with another like group Z upon exposure to radiation.

19. An imide modified glycol according to claim 1, said imide modified glycol being a compound of the formula (III-a)

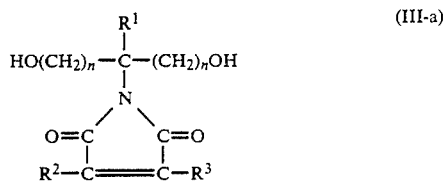
(III-a)

wherein $R^1$ is hydrogen, a lower alkyl radical containing from 1 to about 6 carbon atoms, or phenyl; wherein $R^2$ and $R^3$ may be the same or different and each is a lower alkyl radical containing from 1 to about 3 carbon atoms, or $R^2$ and $R^3$ may be joined together to form, together with the respective carbon atoms to which they are attached, a cyclic hydrocarbyl or substituted hydrocarbyl radical containing from 2 to about 12 carbon atoms and n is from about 1 to about 7.

20. An imide modified according to claim 19 wherein $R^2$ and $R^3$ are each methyl and n is 1.

21. A process for preparing a radiation curable thermoplastic polyurethane, which comprises reacting:

(a) at least 2 glycols including
 (1) one or more macroglycols, each having a molecular weight in the range of 500 to about 7,000, and
 (2) one or more glycol chain extenders, each having a molecular weight less than 500,
at least one of said glycols having a pendent group of the formula (A)

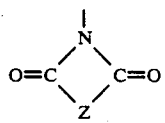 (A)

wherein Z is an unsaturated divalent hydrocarbyl or substituted hydrocarbyl group containing from 2 to about 12 carbon atoms and capable of undergoing crosslinking with another like group Z upon exposure to radiation; and (b) an organic diisocyanate or mixture thereof, under conditions yielding said radiation curable polyurethane.

22. A process according to claim 21 wherein at least one of said macroglycols includes one or more pendent groups of the foregoing formula (A).

23. A process according to claim 21 wherein at least one of said chain extenders contains a pendent group of the foregoing formula (A).

24. A process according to claim 21 where said pendent group has the following formula (A').

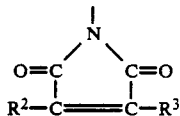 (A')

wherein $R^2$ and $R^3$ may be the same or different, and each is hydrogen or a lower alkyl radical containing from 1 to about 3 carbon atoms, or $R^2$ and $R^3$ may be joined together to form, together with the respective carbon atoms to which they are attached, a cyclic hydrocarbyl or substituted hydrocarbyl radical containing from 2 to about 12 carbon atoms.

25. A process according to claim 21, further including the step of radiation curing said radiation curable polyurethane.

26. A process according to claim 25 wherein said radiation curable polyurethane is cured by means of ultraviolet light.

27. A process for preparing an intermediate of the formula (III):

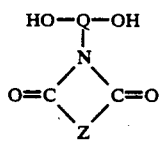 (III)

wherein: Q is a trivalent hydrocarbyl or substituted hydrocarbyl radical in which the valence bonds are attached to different carbon atoms, and Z is an unsaturated divalent hydrocarbyl or substituted hydrocarbyl group containing from 2 to about 12 carbon atoms and capable of undergoing crosslinking with another like group Z upon exposure to radiation; said process comprising reacting an amino glycol of the formula (I)

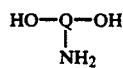 (I)

with an anhydride of the formula (II)

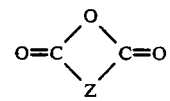 (II)

28. A process according to claim 27 wherein said intermediate has the formula (III-a)

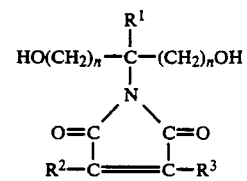 (III-a)

said anhydride has the formula (II-a)

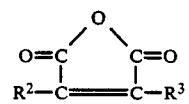 (II-a)

and wherein
$R^1$ is hydrogen or lower alkyl of 1 to about 4 carbon atoms;
$R^2$ and $R^3$ may be the same or different, and each is hydrogen or a lower alkyl radical containing from 1 to about 3 carbon atoms, or $R^2$ and $R^3$ may be joined together to form, together with the respective carbon atoms to which they are attached, a cyclic hydrocarbyl or substituted hydrocarbyl radical containing from 2 to about 12 carbon atoms and
n is from 1 to 7.

29. A process according to claim 28 wherein
$R^1$ is a lower alkyl radical of 1 to about 4 carbon atoms;
$R^2$ and $R^3$ are each lower alkyl radicals containing from 1 to about 3 carbon atoms;
m and n are equal and each is from 1 to 7.

30. A process according to claim 29 wherein:
$R^1$ is ethyl;
$R^2$ and $R^3$ are each methyl;
m and n are each 1.

31. A process according to claim 27, further including the step of reacting said intermediate of the formula (III) with an esterifying agent or a mixture thereof, under esterification or etherification conditions.

32. A radiation curable thermoplastic polyurethane being the reaction product of at least one organic diisocyanate and at least one macroglycol having a molecular weight of from about 500 to about 7,000, said polyurethane further having hard segments and soft segments, said soft segment including pendent groups of the formula (A)

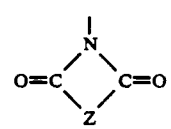 (A)

wherein Z is an ethylenically unsaturated hydrocarbyl or substituted hydrocarbyl group containing from 2 to about 12 carbon atoms and wherein said pendent group (A) is capable of undergoing crosslinking with another like pendent group of the above formula (A), said pendent groups (A) being linked directly to carbon atoms.

33. A radiation curable thermoplastic polyurethane according to claim 1, wherein said polyurethane is curable by ultraviolet radiation.

34. A radiation curable thermoplastic polyurethane according to claim 1, wherein said pendent group (A) is either within the backbone of said polyurethane, or is linked with said backbone through a direct linkage of one or more carbon atoms.

35. A radiation curable thermoplastic polyurethane according to claim 1, wherein said polyurethane is the product of a melt polymerization.

* * * * *